United States Patent [19]
Ogino

[11] Patent Number: 5,475,663
[45] Date of Patent: Dec. 12, 1995

[54] INFORMATION RECORDING/REPRODUCING APPARATUS

[75] Inventor: Tsukasa Ogino, Yokohama, Japan

[73] Assignee: Canon Kabushiki Kaisha, Tokyo, Japan

[21] Appl. No.: 235,232

[22] Filed: Apr. 29, 1994

Related U.S. Application Data

[63] Continuation of Ser. No. 658,327, Feb. 20, 1991, abandoned.

[30] Foreign Application Priority Data

Feb. 22, 1990 [JP] Japan ................................. 2-39749
Feb. 23, 1990 [JP] Japan ................................. 2-41120
Mar. 8, 1990 [JP] Japan ................................. 2-54881

[51] Int. Cl.$^6$ .................................................. G11B 7/09
[52] U.S. Cl. ........................... 369/44.28; 369/44.29; 369/44.34; 369/44.35; 260/78.06
[58] Field of Search ................... 369/44.28, 44.34, 369/44.29, 44.25, 44.35, 44.32; 360/78.05, 78.06, 78.08, 78.13

[56] References Cited

U.S. PATENT DOCUMENTS

| | | | |
|---|---|---|---|
| 4,524,398 | 6/1985 | Fujiki | 360/78 |
| 4,677,507 | 6/1987 | Elliott | 360/78 |
| 4,719,610 | 1/1988 | Bates et al. | 369/32 |
| 5,072,434 | 12/1991 | Uchikoshi et al. | 369/44.28 |
| 5,077,716 | 12/1991 | Takeda et al. | 369/44.34 |
| 5,146,440 | 9/1992 | Yamauchi et al. | 369/44.34 X |

FOREIGN PATENT DOCUMENTS

| | | |
|---|---|---|
| 0111654 | 6/1984 | European Pat. Off. . |
| 0409574 | 1/1991 | European Pat. Off. . |
| WO8908917 | 9/1989 | WIPO . |

OTHER PUBLICATIONS

Mizoshita, et al., "Head–Positioning Servo Design for Disk Drives," Fujitsu–Sci. Tech. Jour., vol. 18, No. 1, Mar. 1982, pp. 101 through 115.

*Primary Examiner*—Georgia Y. Epps
*Assistant Examiner*—Muhammad N. Edun
*Attorney, Agent, or Firm*—Fitzpatrick, Cella, Harper & Scinto

[57] ABSTRACT

An information recording/reproducing apparatus is provided with a velocity control device for moving a recording and/or reproducing head from a current track to a target track under velocity control. A target velocity for the head is determined and the moving velocity of the head is detected by a detector. An instruction value for an actuator for moving the head is generated at every predetermined calculating interval on the basis of the target velocity and the detected velocity so that the head follows the target velocity. In the generation of the instruction value for the actuator for the head, the calculating interval can be switched into plural values by a switching device until the head reaches the target track.

22 Claims, 12 Drawing Sheets

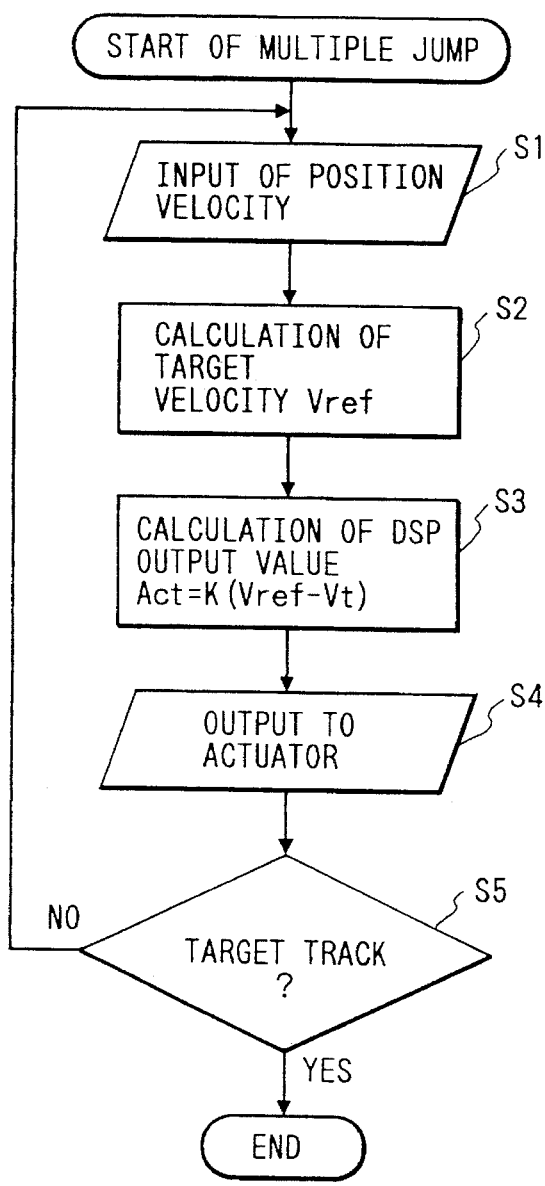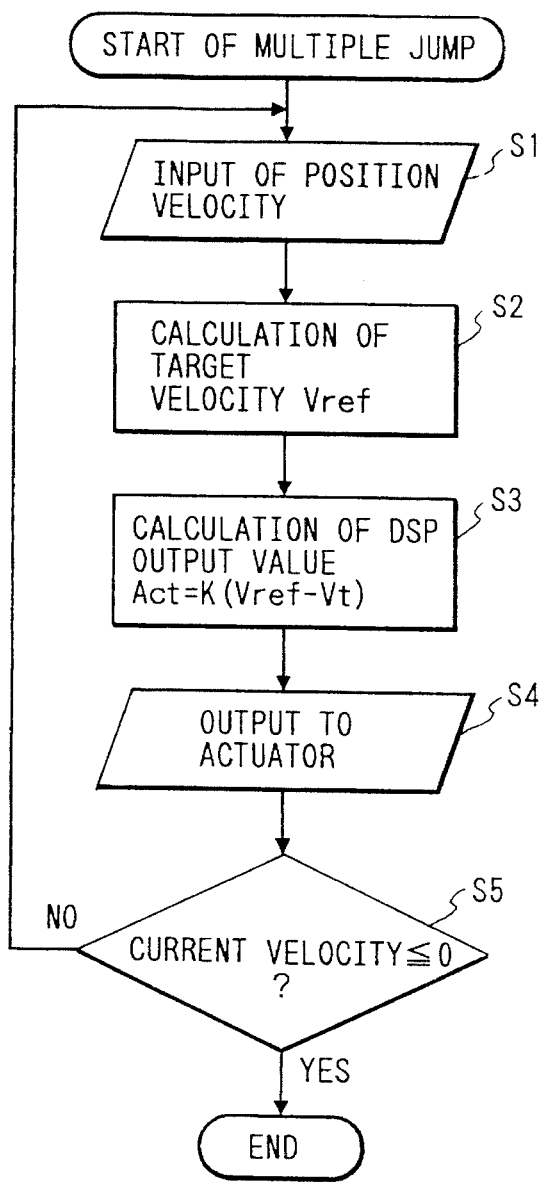

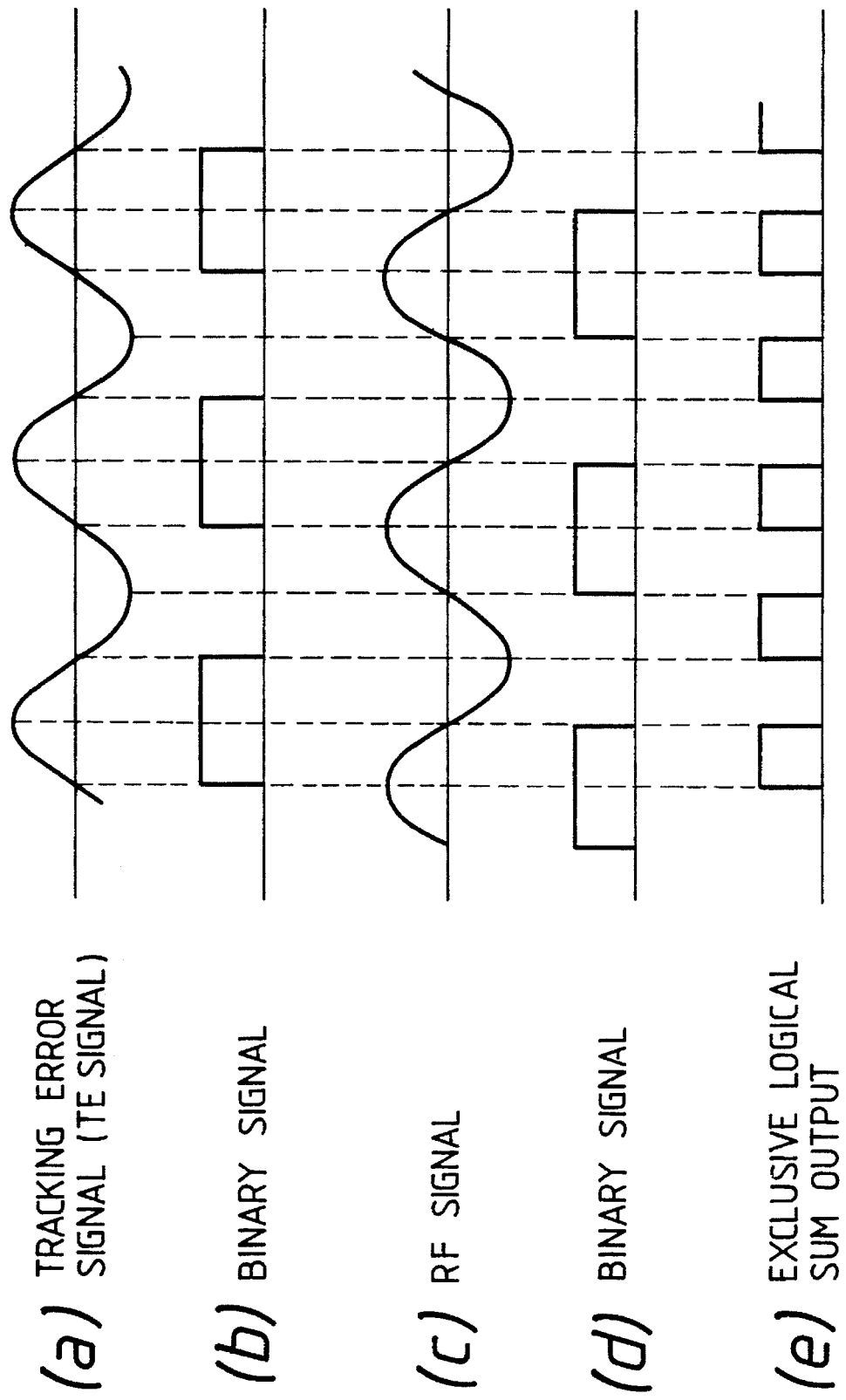

INFORMATION RECORDING/REPRODUCING APPARATUS

This application is a continuation of prior application, Ser. No. 07/658,327 filed Feb. 20, 1991, now abandoned.

BACKGROUND OF THE INVENTION

1. Field of the Invention

The present invention relates to an information recording/reproducing apparatus employing, for example, a magnetic disk or a magnetooptical disk, and more particularly to a velocity control device for an information recording and/or reproducing head for access to a target track, adapted for use in such apparatus.

2. Related Background Art

For velocity control of such a head (or a light beam spot in the case of an optical disk), there has generally been employed a closed loop control in which, as shown in FIG. 1, generated is a reference velocity proportional to the square root of the residual distance to the target position and the head is made to follow said reference velocity. A control method, the actual head velocity is detected by a velocity detecting circuit, and the control for following said reference velocity is achieved by the thus detected speed signal.

FIG. 2 shows an example of said velocity detecting circuit, wherein provided are a shaping circuit 100 for shaping a tracking error signal into a binary signal; a digital differentiating circuit 101 composed of a delay circuit 102 and an exclusive OR circuit 103; and a monostable multivibrator 104.

Said velocity detecting circuit functions in the following manner. At first, as shown in FIG. 12, an automatic tracking (AT) error signal is binary digitized by the shaping circuit 100 into a pulse signal with a duration corresponding to a half cycle of said error signal. Then the digital differentiating circuit 101 generates trigger pulses, for supply to the monostable multivibrator 104, at the upshift and downshift of said binary signal. In response, the monostable multivibrator 104 generates a pulsed velocity signal with a duration τ, which varies the cycle time thereof according to the change in cycle time of the AT error signal. Since the velocity is proportional to the cycle time of the AT error signal, the velocity signal can be generated by the processing of said AT error signal AT. Also, said digital velocity signal can be converted, by averaging, into an analog signal.

However, the output of said velocity detecting circuit cannot be practically used as the velocity signal when the velocity approaches zero, as the interval of output pulses of the monostable multivibrator is extended. Consequently an exact closed loop control is difficult in the speed control method explained in FIG. 1. In addition, in the above-explained control method, the band region of the closed loop is limited by the resonance, usually in the 2 to 3 kHz region, of the actuator mechanism for head driving. For this reason the response is deteriorated in a rapid deceleration, whereby the velocity at the end of a seeking operation cannot be brought to zero, and overrun of the target position results. In order to avoid this drawback, there is employed a method of applying a large current to the actuator achieving acceleration within a short time, and effecting the deceleration in a gradual manner. However, such a control method results in an increased seek time because the deceleration is only gradually achieved without fully utilizing the accelerating ability.

In order to avoid such a drawback there is proposed a control method shown in FIG. 4, in which an open-loop bang-bang control is used for a major portion of the access distance, and the closed-loop control is adopted from immediately before the target position. This control method can reduce the seek time, because rapid deceleration is possible with a large current.

However, this control method may result in an overrun or leave a residual distance to the target position if the acceleration or deceleration is not conducted at appropriate points due to the influence of friction, external force, etc. since the bang-bang control is conducted in an open loop. On the other hand, the aforementioned closed-loop control method has to sacrifice the seek time in order to prevent the overrun. Thus, it is difficult to achieve high speed and accuracy at the same time in either method.

SUMMARY OF THE INVENTION

In consideration of the foregoing, the object of the present invention is to provide an information recording/reproducing apparatus equipped with a velocity control device for a recording and/or reproducing head, capable of exact control even at a high speed, without influence of friction or external force.

The above-mentioned object can be attained, according to the present invention, by an information recording/reproducing apparatus equipped with a velocity control device for moving a recording and/or reproducing head from a current track to a target track under velocity control, provided with:

means for generating a target moving velocity for said head;

means for detecting the moving velocity of said head;

means for generating, at every predetermined calculating interval, an instruction value for an actuator for moving said head, based on said target velocity and the detected velocity, in such a manner that said head follows said target velocity; and means for switching said calculating interval among plural values until said head reaches the target track.

BRIEF DESCRIPTION OF THE DRAWINGS

FIG. 10 is a flow chart of the control sequence of the embodiment shown in FIG. 9;

FIG. 11 is a flow chart of another control sequence;

FIGS. 12(a) to (e) are timing charts showing the detection of zero-cross points and peak points in the velocity/position detecting circuit in the second embodiment shown in FIG. 9;

DETAILED DESCRIPTION OF THE PREFERRED EMBODIMENTS

Figure 5:
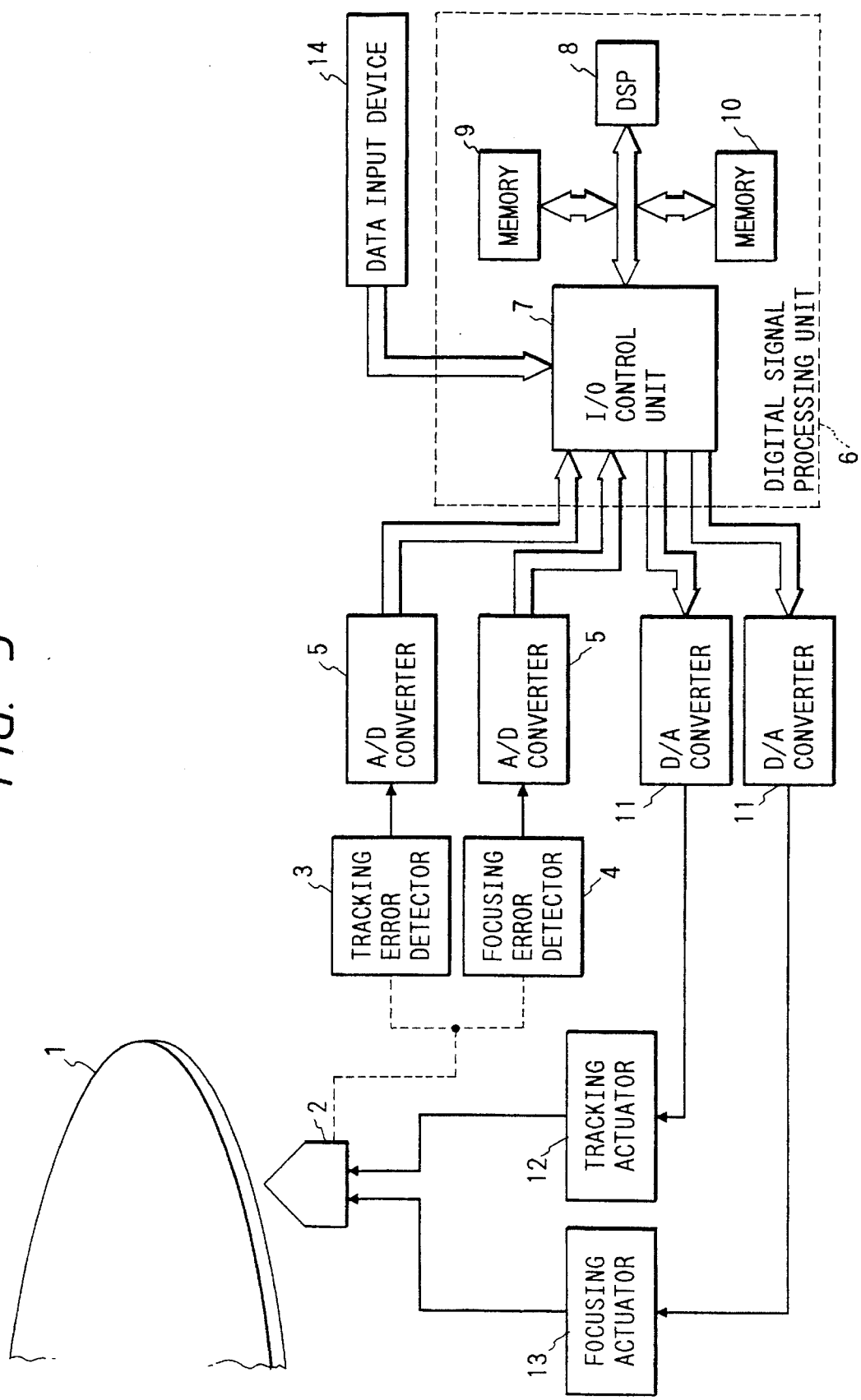
FIG. 5 is a block diagram of an embodiment of the information recording/reproducing apparatus of the present invention.

Now the present invention will be clarified in detail by embodiments thereof shown in the attached drawings. FIG. 5 is a block diagram of an embodiment of the information recording/reproducing apparatus of the present invention, said embodiment being applied to an optical disk recording/reproducing apparatus Referring to FIG. 5, there are shown an optical disk 1; an optical system 2; a tracking error detector 3 for generating a tracking error signal based on the output from the optical system 2; a focus error detector 4 for generating a focus error signal based on the output from said optical system 2; A/D converters 5 for converting the error signals from said error detectors into digital signals; a digital signal processing unit 6 comprised of an I/O control unit 7, a digital signal processor (DSP) 8, and memories 9, 10; D/A converters 11; a tracking actuator 12; a focusing actuator 13; and an external data input device 14.

Figure 6:
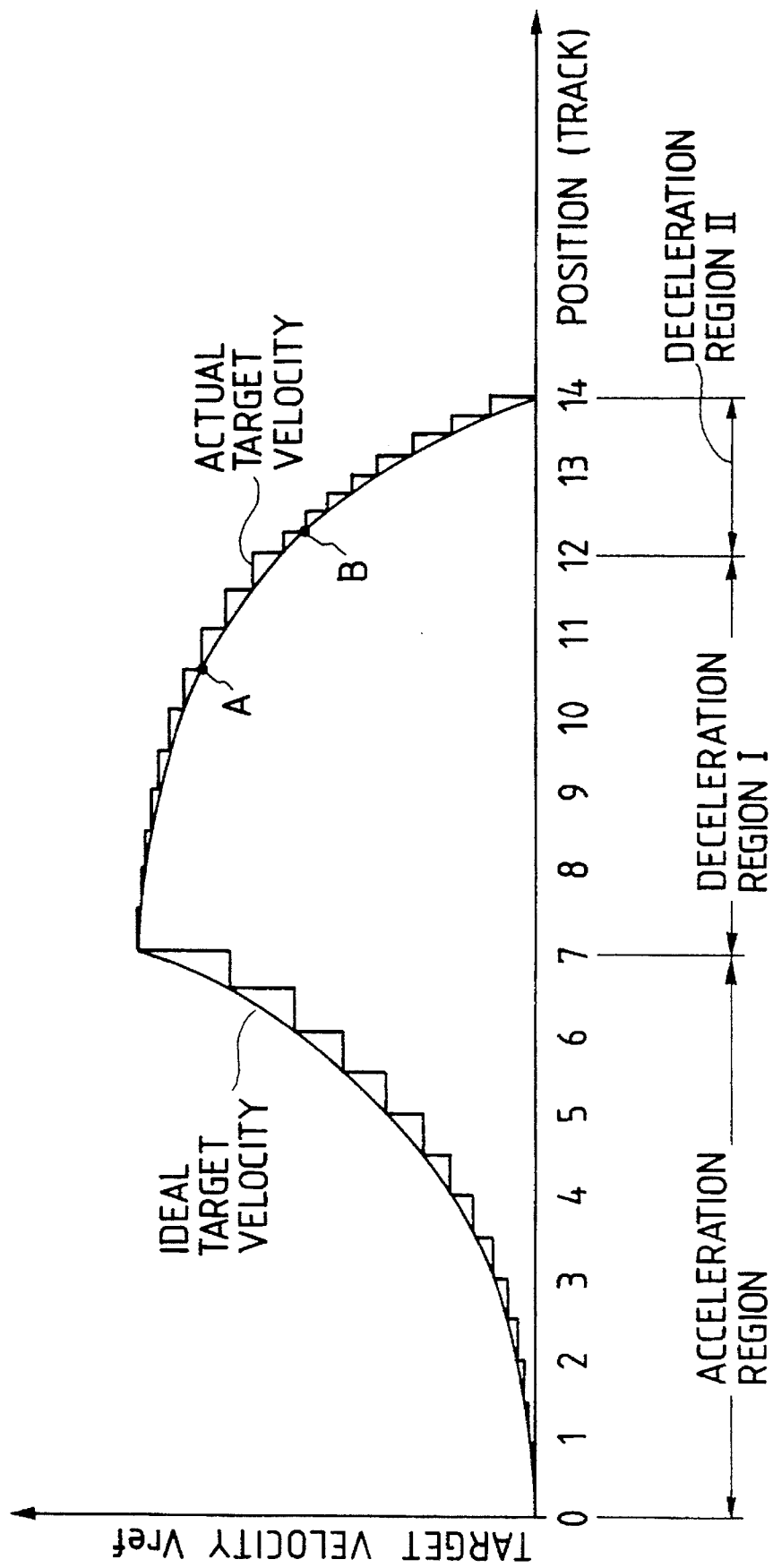
FIG. 6 is a chart showing the relationship between the target position and the target velocity in a multiple jump operation in said embodiment.

In the following there will be explained the basic function of the present embodiment. FIG. 6 is a chart showing the relationship between the target velocity of the light beam spot (or optical head) and the track position in a multijump operation. FIG. 6 also shows an ideal target velocity, but actually used are discrete target velocities.

In the illustrated example, the final target track is track 14. An acceleration region extends to a track 7, and a deceleration region starts thereafter and extends to the track 14. The deceleration region is divided into a deceleration region I and a deceleration region II, with different precisions of velocity control. The division of said deceleration regions is suitably determined in consideration of the decelerating ability. In the present example, the velocity control in the decelerating region I is conducted every ½ track as in the acceleration region, but that in the region II is conducted every ¼ track for finer control. More specifically, the velocity control is conducted by determining the target velocity of the light beam spot (or optical head), current velocity thereof and instruction value for the tracking actuator (or head actuator) at every ½ track in the acceleration region or in the deceleration region I, and at every ¼ track in the deceleration region II. The velocity control may also be achieved by storing a velocity profile corresponding to the moving distance in a memory, and reading these data according to the moving position at every ½ or ¼ track.

Figure 7:
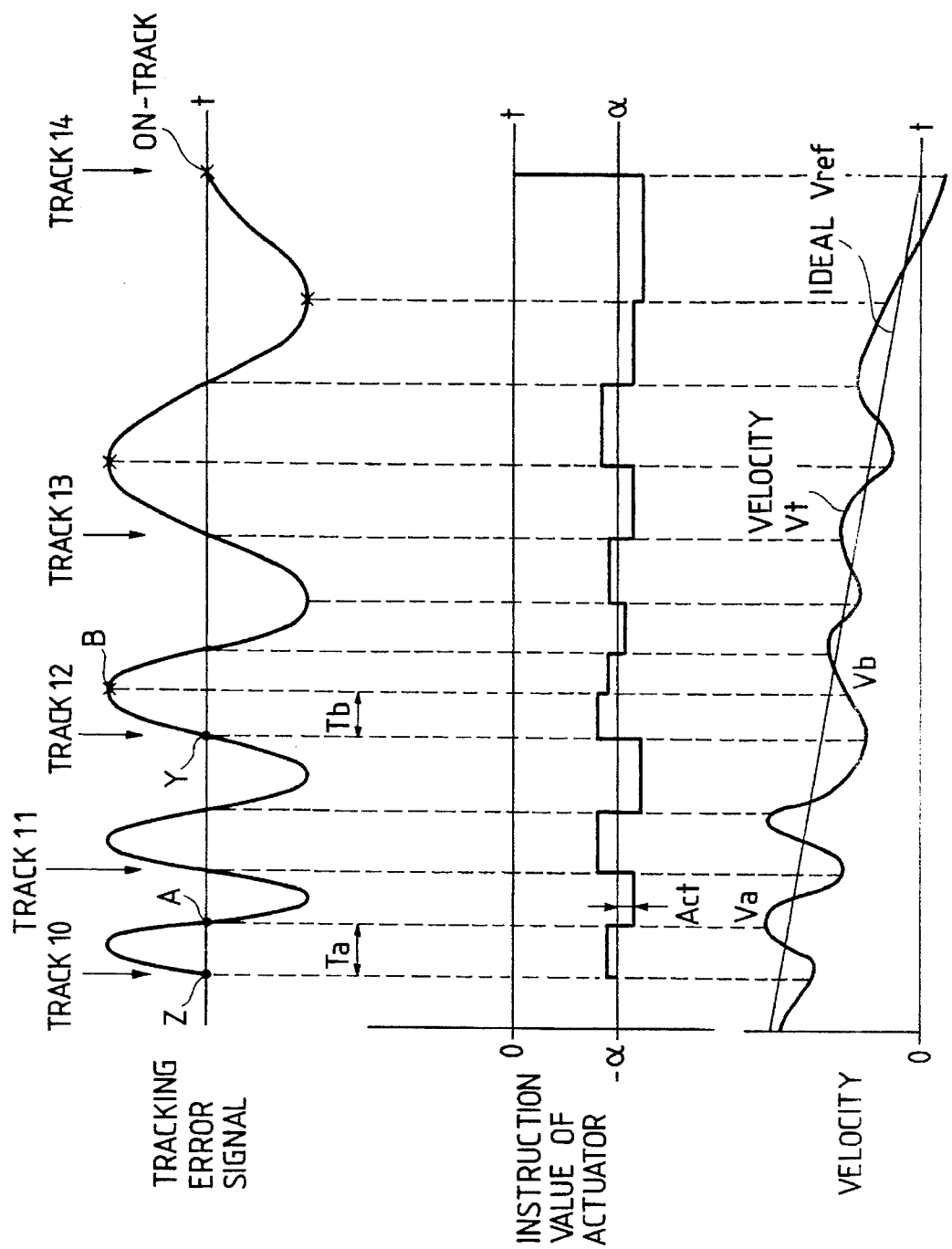
FIG. 7 is a timing chart showing the relationship among the tracking error signal, the actuator instruction value and the velocity.

FIG. 7 is a chart showing the relationship among the tracking error signal, the instruction value for the actuator and the velocity thereof in four tracks before reaching the target track.

In this example, since the tracks 10 to 12 belong to the deceleration region I, the velocity is calculated at every ½ track, and the difference from the target velocity is added to the reference acceleration for driving the actuator. The velocity calculation at every ½ track is in fact conducted at the detected zero-cross points of the tracking error signal. For example, at a point A shown in FIG. 7, the time Ta needed from an immediately preceding zero-cross point Z to said point A is measured, and the current velocity Va is calculated from the following equation:

$$Va = \tfrac{1}{2}\lambda \times 1/Ta \tag{1}$$

wherein $\lambda$ is the track pitch.

The target velocity is $V_{ref}$ at the point A in FIG. 6, and the control amount act of the actuator is calculated by the following equation:

$$act = -\alpha + K(V_{ref} - V_a) \tag{2}$$

wherein $-\alpha$ is the reference deceleration, and K is the feedback gain for velocity control.

Then the tracks 12 to 14 belong to the deceleration region II, the velocity is calculated every ¼ track, and the difference from the target velocity is added to the reference acceleration for driving the actuator. In this case the velocity calculation at every ¼ track is conducted by detecting the zero-cross points and peak points of the tracking error signal alternately and utilizing the measured time between these points. In FIG. 7, the zero-cross points and peak points are respectively indicated by "." and "*".

For example, at a point B in FIG. 7, the current velocity $V_b$ is obtained from the following equation, based on the time $T_b$ measured from Y to B:

$$V_b = \tfrac{1}{4}\lambda \times 1/T_b \tag{3}$$

The target velocity in this state is $V_{ref}$ at the point B in FIG. 6, so that the instruction act for the actuator is calculated as follows:

$$act = -\alpha + K(V_{ref} - V_b) \tag{4}$$

Control based on the thus calculated values provide a velocity curve as shown in FIG. 7. It will be understood that the actual velocity $V_t$ follows the ideal velocity $V_{ref}$ satisfactorily.

In the following there will be explained equations for obtaining the target velocity $V_{ref}$ in FIGS. 6 and 7.

In general, at a residual distance S to the target position and with an acceleration ability $\alpha$, the target velocity $V_{ref}$ for reaching V=0 after t seconds is obtained by solving the following simultaneous equations:

$$V_{ref} t - \tfrac{1}{2}\alpha t^2 = S \text{ (for distance)} \tag{5}$$

$$V_{ref} - \alpha t = 0 \text{ (for velocity)} \tag{6}$$

The following equation on the target velocity is obtained by erasing t from these simultaneous equations:

$$V_{ref} = \sqrt{2\alpha S} \tag{7}$$

The residual distance S can be obtained from the following equations:

$$s = (S_A - \lambda/2 \times N) \tag{8}$$

$$S = (S_A - \{\lambda/2 \times N + \lambda/4\}) \tag{9}$$

wherein $S_A$ is a target moving distance (distance from the starting track to the target track), $\lambda$ is the track pitch, and N is the zero-cross count. The equation (8) is used in the calculation at the detection of a zero-cross point, while the equation (9) is used in the calculation at the detection of a peak point. These equations indicate that the target velocity is proportional to the square root of the residual distance.

The above-explained method serves to easily detect the current velocity from the tracking error signal. Thus, such a velocity detecting method not 25 only dispenses with a complicated velocity detecting circuit, but also resolves the drawback of the conventional method of inaccurate detection at the velocity close to zero. Consequently, such velocity detecting method serves to simplify the structure of the apparatus and to achieve accurate velocity control of the head.

Figure 8:
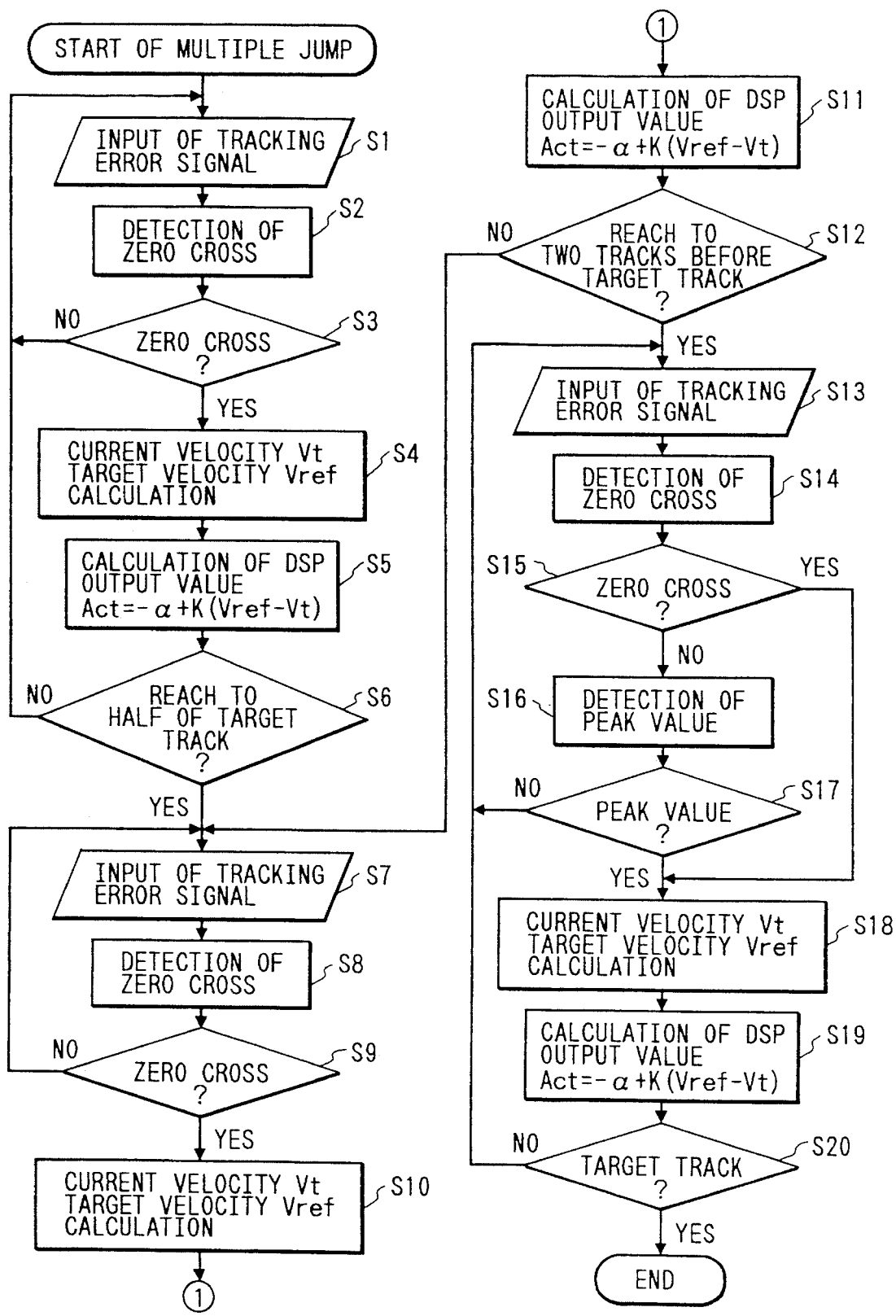
FIG. 8 is a flow chart of the control sequence of the multiple jump operation.

In the following the function of the present first embodiment will be explained in more detail. FIG. 8 is a flow chart of the control sequence, as an example, in a multiple jump operation to a direction (inward movement). FIG. 8 shows the control sequence in a case of multiple jumps from the track 0 to 14 shown in FIG. 6, with predetermined precision in the acceleration region, deceleration regions I and II as explained before.

At first a step S1 enters the tracking error signal into the digital signal processor (DSP) 8. In more detail, in FIG. 5, the light reflected from the optical disk 1 enters the optical system 2, and the tracking error detector 3 detects the tracking error signal $S_n$, which is converted in the A/D converter 5 into a digital signal and supplied to the DSP 8 through the I/O control unit 7.

In a step S2, the DSP 8 detects the zero-cross point of the tracking error signal. As an example, an estimated next tracking error signal $S'_{n+1}$ is determined as follows from the entered tracking error signal $S_n$ and a preceding tracking error signal $S_{n-1}$ stored in the memory 9:

$$S'_{n+1}=2S_n-S_{n-1} \tag{10}$$

Then the obtained estimated value and the current value are multiplied, and, if the product is zero or has a negative sign, the tracking error signal is identified to be at the zero-cross point. A product equal to zero or-having a negative sign indicates that the estimated value is on the zero-cross point of the tracking error signal or assumes a positive or negative value beyond said zero-cross point, so that such an estimated point is regarded as the zero-cross point. The step S2 effects such zero-cross point detection at each sampling of the tracking error signal, and, upon detection of said zero-cross point in a step S3, the sequence proceeds to a step S4. Except in the detection of the zero-cross point in the step S3, the DSP 8 is released until the next sampling and can therefore be used for other tasks. When the zero-cross point is detected, the content of an unrepresented counter for counting the number of appearances of the zero-cross point is increased by one.

The step S4 determines the current velocity $V_t$ and the target velocity $V_{ref}$ as explained in relation to FIGS. 6 and 7. As explained in FIG. 7, the current velocity $V_t$ can be calculated from the following equation, from the half cycle time T of the tracking error signal in this state and ½λ:

$$V_t=\frac{1}{2}\lambda \times 1/T \tag{11}$$

Also, the target velocity can be obtained as follows:

$$V_{ref}=\sqrt{2\alpha S} \tag{12}$$

wherein the residual distance S can be obtained from the foregoing equations (8) and (9).

In a step S5, the DSP 8 determines the instruction value act for the actuator from the thus obtained current velocity and target velocity. As the control is now in the acceleration region, said instruction value is calculated as follows:

$$act=\alpha+K(V_{ref}-V_t) \tag{13}$$

The instruction value is supplied through the I/O control unit 7 to the D/A converter 11 for conversion into an analog signal, which is used for driving the tracking actuator 12 (or the head actuator (linear motor) in a case when the velocity control is conducted on an optical head). Then a step S6 discriminates whether a half distance to the target track has been reached, namely whether the acceleration region shown in FIG. 6 has been terminated, by counting the number of crossed tracks with an unrepresented counter, and, if the count indicates that said half distance has been reached, the sequence proceeds to a step S7. Thus, in the acceleration region representing a half of the distance to the target track, the actuator is driven with the instruction value determined at every ½ track by repeating the steps S1 to S6.

When said half distance is reached, the sequence proceeds to the step S7 to initiate the control in the deceleration region I as already explained in relation to FIG. 6. At first the step S7 enters the tracking error signal, then a step S8 effects the detection of the zero-cross point as explained before, and a step S9 discriminates whether the zero-cross point has been reached. Upon detection of the zero-cross point, a step S10 determines the current velocity and the target velocity in the identical manner as in the step S4. Then, in a step S12, the DSP 8 determines the instruction value act for the actuator as follows, based on said current velocity and target velocity:

$$act=-\alpha+K(V_{ref}-V_t) \tag{14}$$

The actuator is similarly driven according to said instruction value. A step S12 discriminates whether a second track in front of the target track has been reached, namely whether the deceleration region I has been terminated, similarly by means of the zero-cross counter. When the step S12 identifies the end of the deceleration region I, the sequence proceeds to a step S13 for effecting the control in the deceleration region II. Thus, in the deceleration region I, the actuator is driven with the instruction value obtained every ½ track, as in the acceleration region, by repeating the steps S7–S12.

In said deceleration region II, a step S13 enters the tracking error signal, then a step S14 effects the detection of the zero-cross point, and, if a step S15 identifies the zero-cross point, a step S18 determines the current velocity and the target velocity as explained before. On the other hand, if the step S15 does not identify the zero-cross point, a step S16 detects the peak value of the tracking error signal. Then, if a step S17 identifies the peak value, the step S18 determines the current velocity and the target velocity. Thus, the zero-cross points and the peak points of the tracking error signal are alternately detected, and the current velocity and the target velocity are determined at each detection. Stated differently, a precise control at every ¼ track is made possible by alternate detection of the zero-cross points and the peak points. In the step S18, the current velocity $V_t$ is determined as follows:

$$V_t=\frac{1}{4}\lambda \times 1/T \tag{15}$$

wherein T is the time from the zero-cross point to the peak point.

In a step S19, the DSP 8 determines the instruction value act for the actuator, based on the thus obtained current velocity and target velocity according to the following equation:

$$act = -\alpha + K(V_{ref} - V_t) \quad (16).$$

A step S20 discriminates whether the target track has been reached, by means of the count of the zero-cross counter. Thus, in the deceleration region II, the actuator is driven with the instruction value obtained every ¼ track by repeating the steps S13–S20. The multiple jump operation is terminated when the step S20 identifies that the target track has been reached.

Now there will be explained the detection, in the step S16, of a peak point of the tracking error signal. In the present embodiment, the difference $\Delta S_n$ between the entered tracking error signal $S_n$ and the previously sampled tracking error signal $S_{n-1}$ is as follows:

$$\Delta S_{n-1} = S_n S_{n-1} \quad (17).$$

Then said difference $\Delta S_n$ is multiplied by an immediately preceding similar difference $\Delta S_{n-1}$, which is calculated as follows in the preceding sampling and stored in the memory:

$$\Delta S_{n-1} = S_{n-1} - S_{n-2} \quad (18).$$

The peak point of the tracking error signal is identified when the product of $\Delta S_n$ and $\Delta S_{n-1}$ is negative.

As explained in the foregoing, in the present first embodiment, the instruction value for the actuator is calculated every ½ or ¼ track, and the velocity is so controlled as to follow the target velocity curve, so that the light beam spot (or optical head) can be brought to the target track in an ideal manner without unnecessary movement. Thus, a high-speed seeking operation is rendered possible without any wasted movement. Also, since the actuator is driven with the instruction value calculated every ½ or ¼ track, a precise control to the target track is rendered possible without overrun. Consequently, a precise control is possible even at a high speed, so that high speed and precision can be realized, unlike the conventional methods, at the same time.

Figure 9:
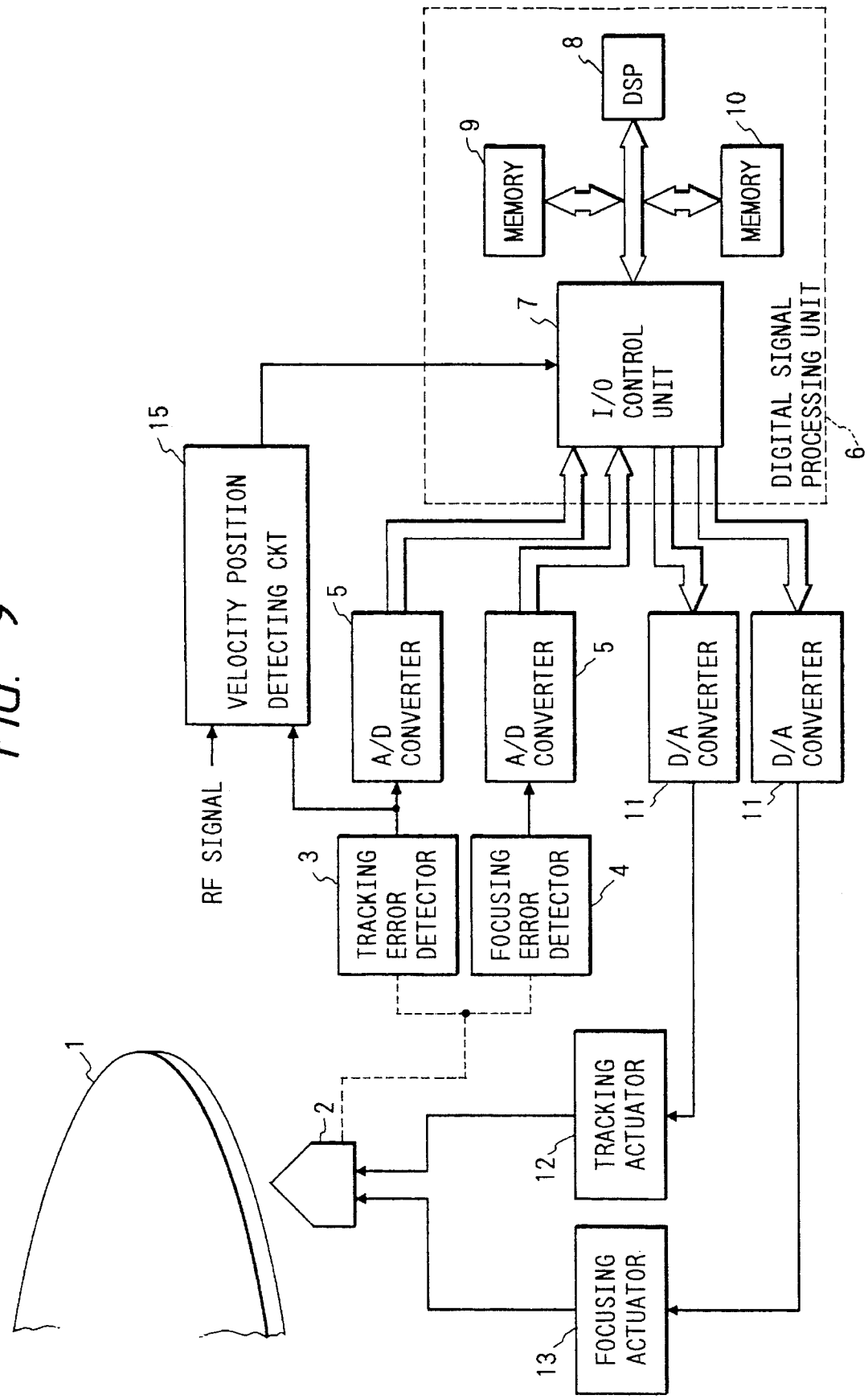
FIG. 9 is a block diagram of a second embodiment.

FIG. 9 is a block diagram of a second embodiment of the present invention, which is identical to with that shown in FIG. 5, except for the presence of a velocity-position detecting circuit 15.

Figure 1:
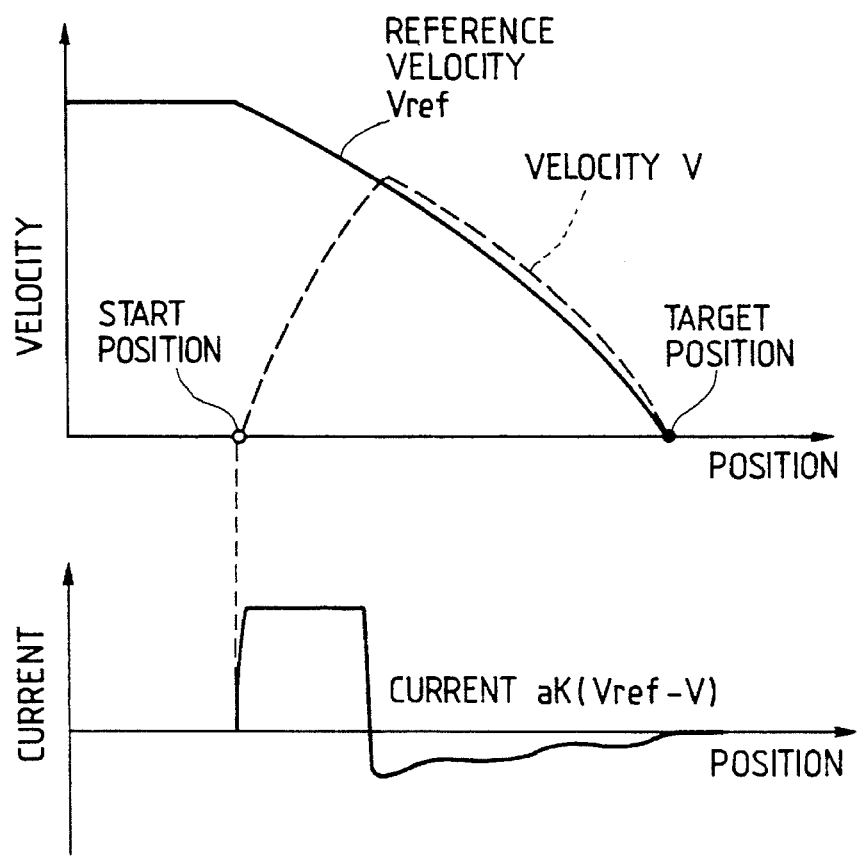
FIG. 1 is a chart showing the relationship between the reference velocity and the actuator current in a conventional velocity control method for a recording and/or reproducing head.
Figure 2:
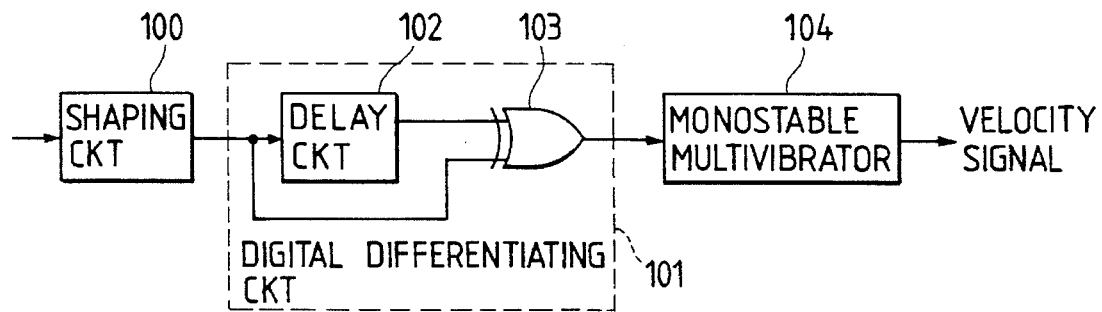
FIG. 2 is a block diagram of a velocity detecting circuit to be used in the control method shown in FIG. 1.
Figure 3:
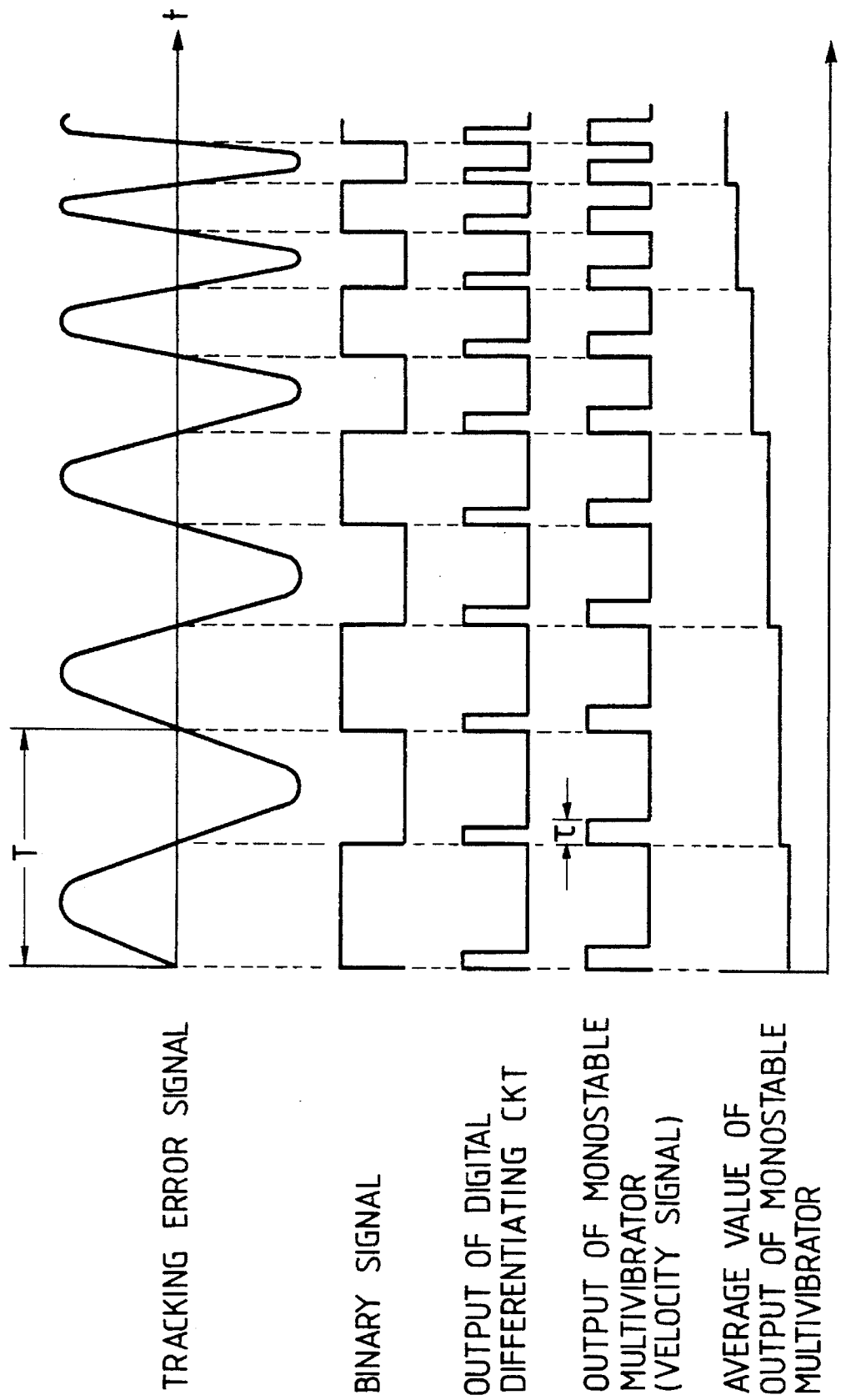
FIG. 3 is a timing chart showing the function of said velocity detecting circuit.
Figure 4:
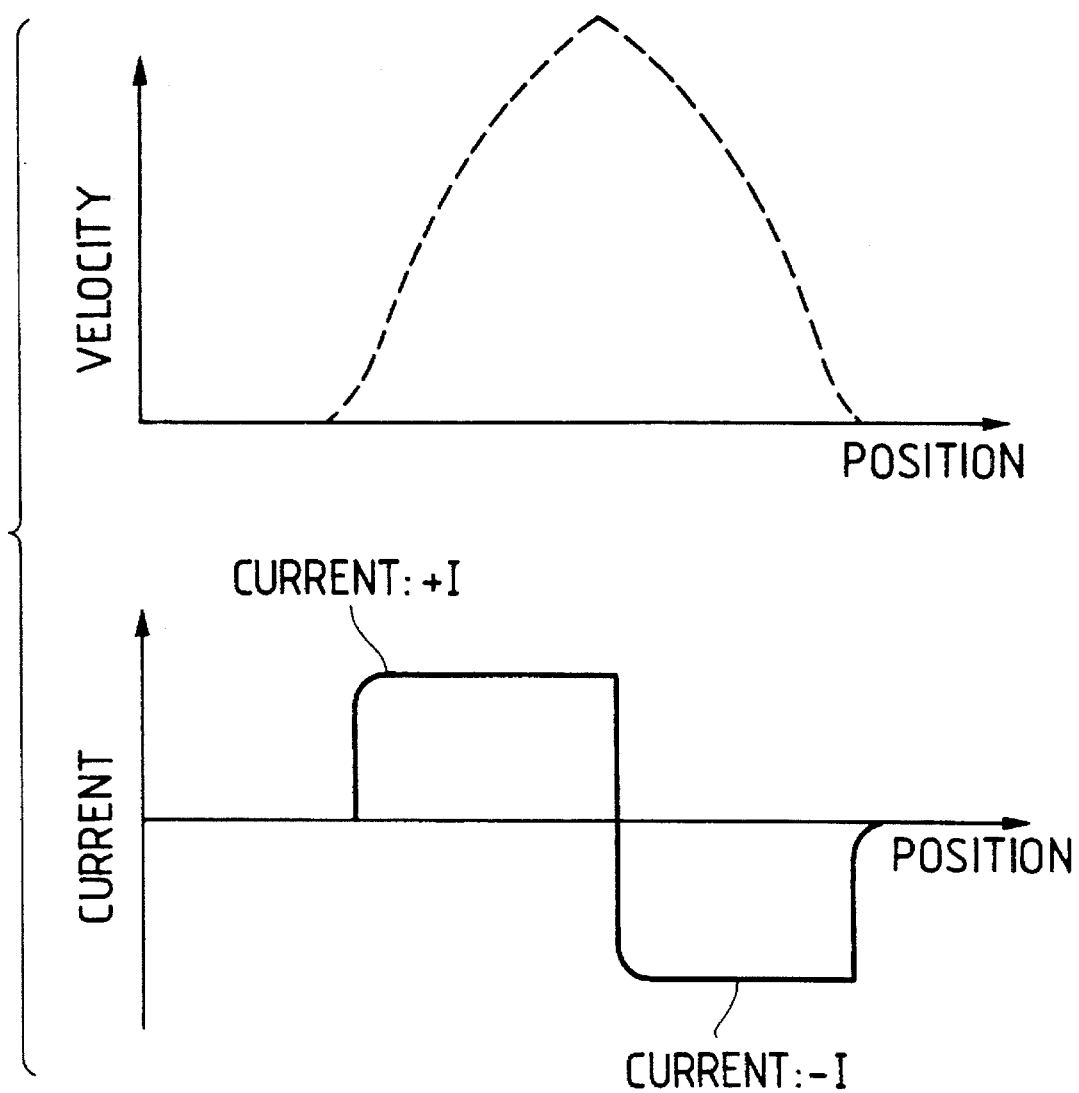
FIG. 4 is a chart showing the relationship between the velocity and the current in a bang-bang control method constituting another conventional example.

The velocity-position detecting circuit 15 serves to detect the actual velocity of the light beam spot (or optical head) and to generate a digital velocity signal. In the embodiment shown in FIG. 5, the velocity is calculated from the tracking error signal, but, in the present embodiment, the velocity is detected by a velocity detecting circuit as shown in FIG. 2. Also, the velocity detection may be conducted by counting clock signals within a predetermined track interval.

In the following there will be explained the function of the present second embodiment, with reference to a flow chart in FIG. 10, showing the function in a multiple jump operation.

Referring to FIG. 10, at first in a step S1, the velocity-position detecting circuit 15 detects the velocity at a predetermined position, and sends a velocity signal to the DSP 8 through the I/O control unit 7. In the present embodiment, the velocity detection is conducted at each of the zero-cross points and the peak points of the tracking error signal. The method of detection of said zero-cross points and peak points for said velocity detection will be explained later in more detail. Then, the DSP 8 calculates the target velocity $V_{ref}$ at the timing of the zero-cross point or peak point, by determining the residual distance S from the current position to the target track and using the following equation:

$$V_{ref} = \sqrt{2\alpha S} \quad (19)$$

wherein S being determined from the equations (8) and (9).

A step S3 calculates the instruction value act for the actuator as follows, from the thus determined target velocity and the current velocity $V_t$ detected by the velocity-position detecting circuit 15:

$$act = K(V_{ref} - V_t) \quad (20).$$

The obtained instruction value is supplied, in a step S4, through the I/O control unit 7 to the D/A converter 11 for conversion into an analog signal, which is used for driving the tracking actuator 12 (or head actuator (linear motor) in a case when the velocity control is conducted on the optical head). Then, a step S5 discriminates whether the target track has been reached, and, if not, the sequence returns to the step S1 to repeat the sequence of the steps S1 to S5. In this manner the actuator is driven with the instruction value obtained at the zero-cross points and the peak points of the track error signal, namely every ¼ of the track pitch, and the multiple jump operation is terminated when the target track is reached.

Said multiple jump operation may also be terminated when the current velocity becomes zero as shown in FIG. 11. More specifically, a step S5 in FIG. 11 discriminates whether the current velocity has reached zero, and, if affirmative, the multiple jump operation may be terminated. It is naturally possible also to terminate the multiple jump operation when either of the conditions shown in FIGS. 6 and 7 is satisfied.

In the following there will be explained the detection of the zero-cross point and the peak point of the tracking error signal, by the velocity-position detecting circuit 15, with reference to FIG. 12.

In FIG. 12, (a) indicates the tracking error (TE) signal, (b) indicates a binary signal obtained from said tracking error signal, (c) indicates an RF (regenerated) signal with a phase advanced by 90° from that of the TE signal, and (d) indicates a binary signal obtained from said RF signal. In general the TE signal is obtained as the difference of signals from divided sensors, whereas the RF signal is obtained as the sum, so that the TE and RF signals are mutually different by 90°.

In the present embodiment, the zero-cross points and the peak points of the TE signal are determined by exclusive logic summing of the binary signals respectively obtained from the TE and RF signals. In FIG. 12, (e) indicates the output of said exclusive logic summing, with upshift coinciding with the zero-cross point of the TE signal and downshift coinciding with the peak point thereof. Such a detection of the zero-cross points and the peak points is rendered possible since the TE and RF signals are mutually different by 90° in phase. The velocity-position detecting circuit 15 detects the velocity and generates a velocity signal at each of the thus detected zero-cross points and peak points.

This second embodiment also provides an advantage of precisely controlling the light beam spot (or optical head) even at a high speed, in an 10 identical manner as in the preceding embodiment shown in FIG. 5.

Though the foregoing embodiments have been limited to an information recording/reproducing apparatus utilizing an optical disk, the present invention is not limited to such embodiments and is naturally applicable advantageously to other recording/reproducing apparatus employing, for example, magnetic disks.

In the following there will be explained a third embodiment of the present invention. The following description will be based on FIG. 5, since the function of said third embodiment can be achieved with an apparatus similar to that shown in FIG. 5.

Figure 13:
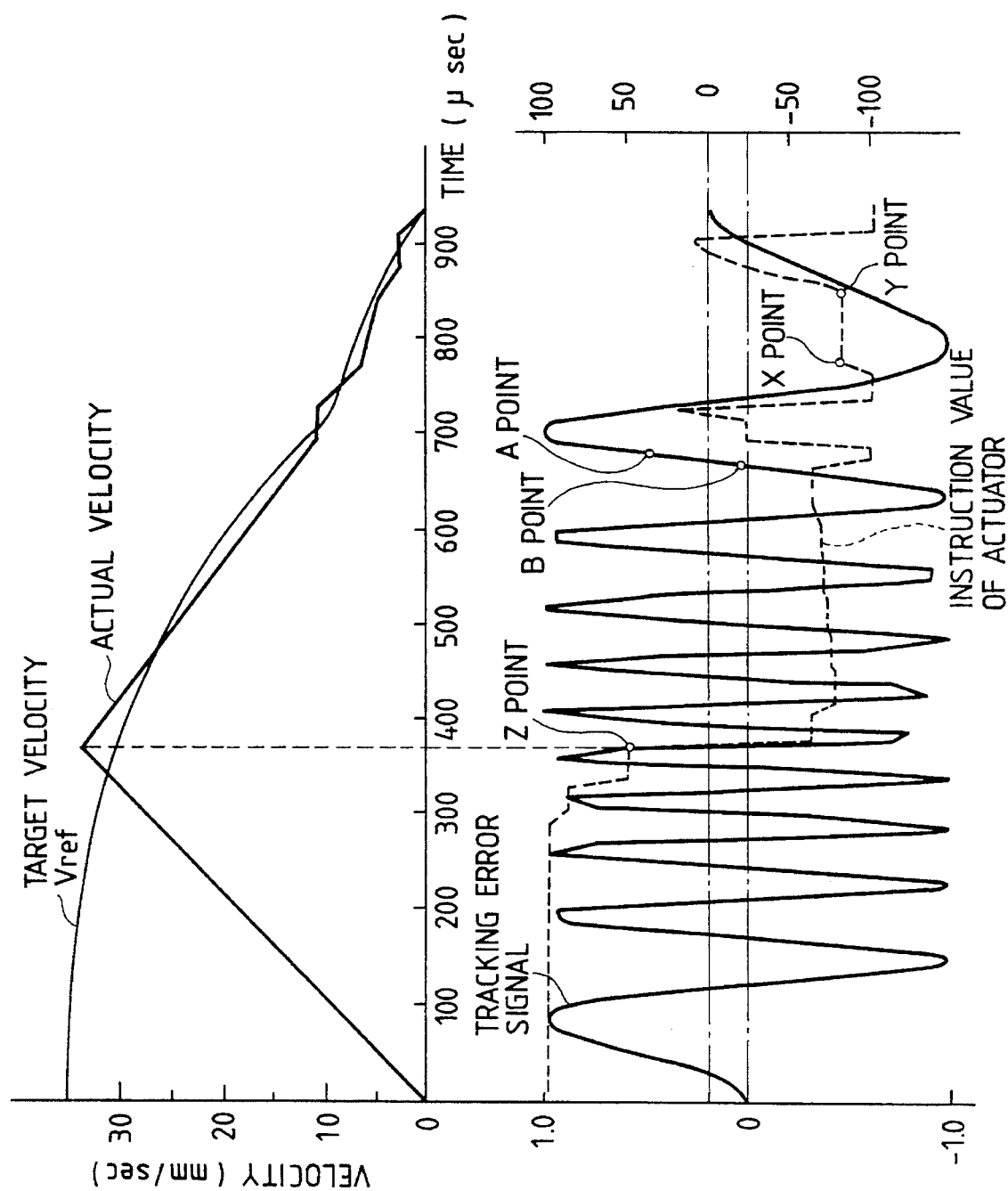
FIG. 13 is a chart showing the relationship among the target velocity and actual velocity of the head, the tracking error signal and the actuator instruction value in a third embodiment.

At first there will be explained the basic function of the present third embodiment. FIG. 13 is a timing chart showing the relationship among the target velocity curve of the light beam spot (or optical head) in a multiple jump operation, the actual velocity thereof, the tracking error signal and the instruction value for the actuator. There is illustrated an example of jumping ten tracks, wherein a cycle of the tracking error signal corresponds to a track.

In the present embodiment, up to the 9th track which is immediately preceding the target track, the zero-cross points of the tracking error signal are detected, and the time $T_2$ from a zero-cross point to a next zero-cross point is measured. The distance between the zero-cross point is measured. The distance between the zero-cross points is ½ of the track pitch $\lambda$, so that the velocity $V_t$ is given by:

$$V_t = \lambda/2 \times 1/T_2 \tag{21}$$

Also, the target velocity $V_{ref}$ is given by the zero-cross count as follows:

$$V_{ref} = \sqrt{2\alpha(S-\lambda/2 \times N)} \tag{22}$$

wherein S is the target moving distance, $\lambda$ is the track pitch and $\alpha$ is the deceleration. Then the instruction value act for the actuator is determined as follows, from the current velocity and the target velocity obtained from the equations (21) and (22):

$$act = \pm\alpha + K(V_{ref} - V_t) \tag{23}$$

wherein $\pm_\alpha$ is the reference acceleration, and K is the feedback gain of the velocity control system.

Thus, the actuator is driven by the instruction value determined at every ½ of the track pitch up to a track immediately preceding the target track. As a result, as shown in FIG. 13, the actuator is accelerated with full power to a point Z and the velocity increases linearly. When the velocity reaches the point Z and catches up to the target velocity, the deceleration is started according to the deceleration $\alpha$ shown in the equation (22).

Then, when the light beam spot (or optical head) moves to a point B, as the velocity has considerably lowered by then, the velocity calculated at every ½ of the track pitch is considerably delayed from the actual velocity. Consequently, the instruction value for the actuator calculated from such calculated velocity leads to an inaccurate control with significant error.

For this reason the velocity is directly obtained from the tracking error signal. More specifically, the velocity $V_t$ is determined as follows, from the tracking error signal $S_B$ sampled at a point B and that $S_A$ sampled at a next point A:

$$V_t = \lambda/4 \, (S_A - S_B)/T_S \tag{24}$$

wherein $T_S$ is the sampling cycle time.

When the tracking error signal is normalized to a range of ±1.0, the moving distance is ¼ $\lambda$ for $(S_A - S_B) = 1.0$. Stated differently, a sloped portion of the sinusoidal tracking error signal is approximated by a straight line, and the velocity in a sampling section is determined from two values sampled at two points on said straight line and the sampling cycle time. Also, the target velocity $V_{ref}$ in this state can be determined by:

$$V_{ref} = \sqrt{2\alpha(S-S_a)} \tag{25}$$

wherein $S_a$ is the moving distance up to this point and can be obtained by calculating the cumulative moving distances.

Thus, the instruction value for the actuator is calculated according to the equation (23), based on the current velocity and the target velocity obtained from the equations (24) and (25).

In the above-explained velocity detecting method utilizing linear approximation, it is difficult to obtain the exact velocity in an area where the tracking error signal is inverted, such as X-Y in FIG. 13. Therefore, in such an area where the linear approximation is not possible, the instruction value at the point X is retained, and the velocity detection by linear approximation is conducted again at the point Y.

Figure 14:
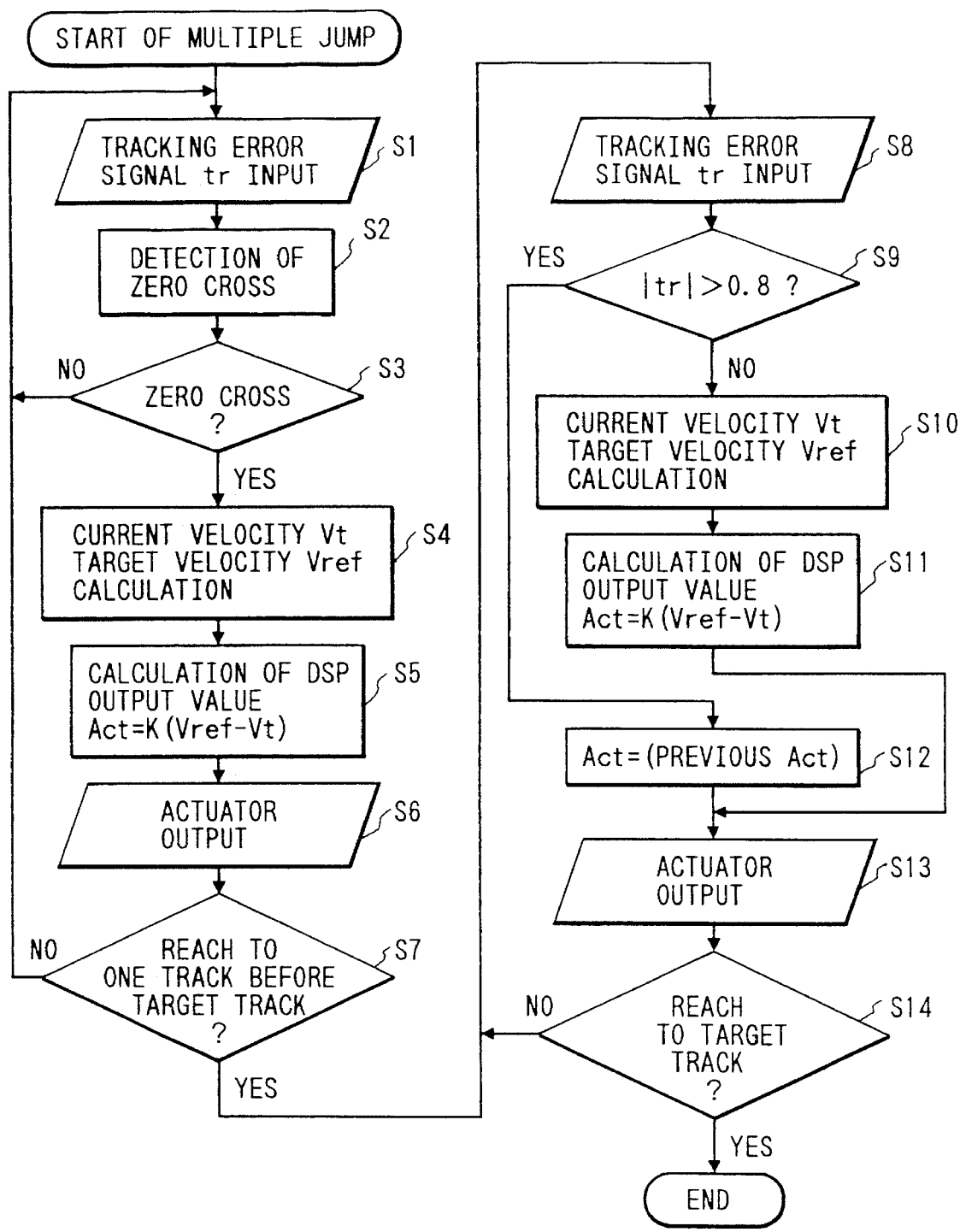
FIG. 14 is a flow chart of the control sequence of said third embodiment.

In the following, explained is the actual function of the present third embodiment with reference to FIG. 14 which is a flow chart of the control sequence in a multiple jump operation in one direction (inwards) of the optical disk. It is also assumed that the control sequence is conducted according to the timing chart shown in FIG. 13.

At first a step S1 the tracking error signal is entered into the DSP 8. More detailedly, the light reflected from the optical disk 1 enters the optical system 2, and the tracking error detector 3 detects the tracking error signal $S_n$, which is converted into a digital signal by the A/D converter 5 and supplied through the I/O control unit 7 to the DSP 8.

In a step S2, the DSP 8 detects the zero-cross point of the tracking error signal. As an example, an estimated next tracking error signal tracking error signal $S_n$ and a preceding tracking $S'_{n+1}$ is determined as follows from the entered error signal $S_{n-1}$ stored in the memory 9:

$$S'_{n+1} = 2S_n - S_{n-1} \tag{26}$$

Then the obtained estimated value and the current value are multiplied, and, if the product is zero or negative, the tracking error signal is identified to be at the zero-cross point. A product which is zero, or negative indicates that the estimated value is on the zero-cross point of the tracking error signal or assumes a positive or negative value beyond said zero-cross point, so that such an estimated point is regarded as the zero-cross point. The step S2 effects such a detection of a zero-cross point at each sampling of the tracking error signal, and, upon detection of said zero-cross point in a step S3, the sequence proceeds to a step S4. Except in the detection of the zero-cross point in the step S3, the DSP 8 is released until the next sampling and can therefore be used for other tasks.

The step S4 determines the current velocity $V_t$ and the target velocity $V_{ref}$ shown in FIG. 13. The current velocity is obtained according to the equation (21) from the time between the zero-cross points and ½ of the track pitch, and the target velocity is obtained from the equation (22). A step S5 calculates the instruction value for the actuator, by the equation (23), based on the current velocity and the target velocity determined by the DSP 8. Said instruction value is supplied through the I/O control unit 7 to the D/A converter 11 for conversion into an analog signal, which is supplied in a step S6 to the tracking actuator 12 (or head actuator (linear motor) in a case when the velocity control is conducted on the optical head).

A step S7 discriminates whether a track immediately preceding the target track, namely approximately the point B in FIG. 13, has been reached, by calculating the number of tracks with an unrepresented zero-cross counter, and, if said track immediately preceding the target track has been reached, the sequence proceeds to a step S8. Thus, up to the track immediately preceding the target track, a control following the target velocity curve shown in FIG. 13 is conducted by repeating the steps S1–S7.

Then, the step S8 enters the tracking error signal into the DSP 8, and a step S9 discriminates whether the value of said signal is within 80% of the maximum amplitude of the tracking error signal. If the absolute values of two samples of the tracking error signal are both within 80% of the maximum amplitude, the calculation of the current velocity is identified possible by the aforementioned linear approximation of the sloped portion of the tracking error signal.

If the step S9 identifies that the tracking error signals are within 80% of the maximum amplitude, a step S10 determines the current velocity and the target velocity from the tracking error signal. The current velocity $V_t$ is calculated by the equation (24), from the difference of the tracking error signal sampled in two points in an area approximated by a straight line and the sampling cycle time. Also, the target velocity $V_{ref}$ at this point is calculated from the equation (25). A step S11 then calculates the instruction value for the actuator based on the thus obtained results, according to the equation (23), and a step S13 drives the actuator by the thus obtained instruction value.

On the other hand, if the step S9 identifies that the tracking error signal, entered into the DSP 8, exceeds 80% of the maximum amplitude, the sequence proceeds to a step S12. Since the velocity calculation by linear approximation is difficult, the step S12 retains the preceding instruction value, and a step S13 sends said value to the actuator. Then a step S14 discriminates whether the target track has been reached, and, if not, the steps S8–S14 are repeated. The multiple jump operation is terminated when the target track is reached. The operation may be terminated when the current velocity becomes zero. In the foregoing explanation, the preceding instruction value for the actuator is retained in an area where the tracking error signal exceeds 80% of the maximum amplitude, but such an example is not limiting. For example, an instruction value of zero may be given to the actuator, which shows a zero acceleration and maintains a constant speed.

As explained in the foregoing, in the present embodiment, the instruction value for the actuator is calculated at every ½ track pitch by detecting the zero-cross points of the tracking error signal, up to a track immediately preceding the target track. Consequently, in such region, the light beam spot (or optical head) can be controlled according to the target velocity curve, thereby achieving a high-speed seeking operation without unnecessary movement.

As the light beam spot (or optical head) approaches the target track, the velocity thereof generally approaches gradually to zero, so that the interval between the zero-cross points of the tracking error signal becomes longer. Since the current velocity determined for every ½ track pitch is an average in such track pitch, its error from the actual velocity becomes larger as the position becomes closer to the target track.

Therefore, in the last track gap immediately in front of the target track, the current velocity is exactly calculated by approximating the sloped portion of the tracking error signal with a straight line and employing signals sampled in such straight line area. Since the tracking error signal is sinusoidal, straight line approximation is possible only in the sloped portion. Consequently, in a section where such straight line approximation is not possible, the instruction value for the actuator is, for example, retained at the preceding signal level. In this manner the seeking operation of the light beam spot (or optical head) can be exactly controlled as the velocity thereof can be exactly calculated even when it is close to the target track.

The foregoing embodiment describes an information recording/reproducing apparatus utilizing an optical disk, but the present invention is not limited to such an embodiment and is likewise applicable advantageously, for example, to a recording apparatus utilizing a magnetic disk or the like.

Also, the present invention is subject to various modifications within the scope and spirit of the appended claims.

It is furthermore possible to combine the first and third embodiments. More specifically, it is possible to further divide the deceleration region II of the first embodiment, thereby effecting a velocity control at every ¼ track pitch immediately after the shift from the deceleration region I, and adopting a velocity control according to the equation (24) when the position comes close to the target track.

What is claimed is:

1. An information recording/reproducing apparatus provided with a velocity control device for moving a recording and/or reproducing head from a current track to a target track under velocity control, said apparatus comprising:

moving means for moving the head in a direction intersecting a track;

generating means for generating a target moving velocity for the head;

detecting means for detecting the moving velocity of the head;

digital calculation means for calculating a difference between the detected velocity and the target velocity and for effecting digital calculation of a control value for velocity control of said moving means with a predetermined calculating interval on the basis of the calculated difference;

varying means for varying the calculating interval of said digital calculation means such that the calculating interval is proportionally shortened as the head approaches the target track; and control means for controlling said moving means on the basis of the control value.

2. An apparatus according to claim 1, wherein said detecting means comprises means for detecting a tracking error signal when the head crosses a track to detect the moving velocity of the head.

3. An apparatus according to claim 2, wherein said detecting means further comprises means for detecting zero-cross points of the tracking error signal and for detecting the moving velocity of the head from a time between the zero-cross points and a distance of ½ of the track pitch.

4. An apparatus according to claim 2, wherein said detecting means further comprises means for detecting zero-cross points and peak points of the tracking error signal and for detecting the moving velocity of the head from a time between a zero-cross point and a peak point, and a distance of ¼ of the track pitch.

5. An apparatus according to claim 2, further comprising means for determining the position of the head relative to the target track and wherein said varying means comprises means for setting the calculating interval equal to a generating interval of zero-cross points of the tracking error signal when the head is positioned far from a target track and for setting the calculating interval equal to a generating interval of the zero-cross point and a peak point of the tracking error signal when the head is positioned close to the target track.

6. An apparatus according to claim 1, wherein said moving means is a linear motor.

7. An apparatus according to claim 1, wherein said detecting means comprises means for determining a level difference of a tracking error signal obtained when the head crosses a track, by sampling within a predetermined amplitude level, and for detecting the moving velocity of the head from the level difference, the sampling interval time and the track pitch.

8. An information recording/reproducing apparatus provided with a velocity control device for moving a recording and/or reproducing head from a current track to a target track under velocity control, said apparatus comprising:

means for generating a target moving velocity of the head;

detecting means for detecting the moving velocity of the head, said detecting means comprising means for determining a level difference of a tracking error signal obtained when the head crosses a track, by sampling within a predetermined amplitude level, and means for calculating the moving velocity on the basis of the following equation, the moving velocity=$(\lambda/4) \times (S/T_S)$, wherein $\lambda$ is a track pitch, S is the level difference, and $T_S$ is the sampling interval time; and generating means for generating an instruction value for an actuator for moving the head, based on the target velocity and the detected velocity, such that the head follows the target velocity.

9. An apparatus according to claim 8, wherein the predetermined amplitude level is 80% of the maximum amplitude.

10. An apparatus according to claim 8, wherein, in an area in which the predetermined amplitude level is exceeded, the actuator is driven with an instruction value generated prior to the area.

11. An optical information recording/reproducing apparatus provided with a velocity control device for moving a light beam spot from a current track to a target track under velocity control, said apparatus comprising:

moving means for moving the light beam spot in a direction intersecting a track;

generating means for generating a target moving velocity for the light beam spot;

detecting means for detecting the moving velocity of the light beam spot;

digital calculation means for calculating a difference between the detected velocity and the target velocity and for effecting digital calculation of a control value for velocity control of said moving means with a predetermined calculating interval on the basis of the calculated difference;

varying means for varying the calculating interval of said digital calculation means such that the calculating interval is proportionally shortened as the head approaches the target track; and control means for controlling said moving means on the basis of the control value.

12. An apparatus according to claim 11, wherein said detecting means comprises means for detecting a tracking error signal when the light beam spot crosses a track to detect the moving velocity of the light beam spot.

13. An apparatus according to claim 12, wherein said detecting means further comprises means for detecting zero-cross points of the tracking error signal and for detecting the moving velocity of the light beam spot from a time between the zero-cross points and a distance of ½ of the track pitch.

14. An apparatus according to claim 12, wherein said detecting means further comprises means for detecting zero-cross points and peak points of the tracking error signal and for detecting the moving velocity of the light beam spot from a time between a zero-cross point and a peak point, and a distance of ¼ of the track pitch.

15. An apparatus according to claim 12, further comprising means for determining the position of the light beam spot relative to the target track and wherein said varying means comprises means for setting the calculating interval equal to a generating interval of zero-cross points of the tracking error signal when the light beam spot is positioned far from the target track and for setting the calculating interval equal to a generating interval of the zero-cross point and a peak point of the tracking error signal when the light beam is positioned close to the target track.

16. An apparatus according to claim 11, wherein said moving means is a linear motor.

17. An apparatus according to claim 11, wherein said detecting means comprises means for determining a level difference of a tracking error signal obtained when the light beam spot crosses a track, by sampling within a predetermined amplitude level, and for detecting the moving velocity of the light beam spot from the level difference, the sampling interval time and the track pitch.

18. An optical information recording/reproducing apparatus provided with a velocity control device for moving a light beam spot from a current track to a target track under velocity control, said apparatus comprising:

means for generating a target moving velocity of the light beam spot;

detecting means for detecting the moving velocity of the light beam spot, said detecting means comprising means for determining a level difference of a tracking error signal obtained when the light beam spot crosses a track, by sampling within a predetermined amplitude level, and means for calculating the moving velocity on the basis of the following equation, the moving velocity=$(\lambda 4) \times (S/T_S)$, wherein $\lambda$ is a track pitch, S is the level difference, and $T_S$ is the sampling interval time; and generating means for generating an instruction value for an actuator for moving the light beam spot, based on the target velocity and the detected velocity, such that the light beam spot follows the target velocity.

19. An apparatus according to claim 18, wherein the predetermined amplitude level is 80% of the maximum amplitude.

20. An apparatus according to claim 18, wherein, in an area in which the predetermined amplitude level is exceeded, the actuator is driven with an instruction value generated prior to the area.

21. A velocity controlling method in which a recording and/or reproducing head is moved from a current track to a target track under velocity control, said method comprising the steps of:

generating a target moving velocity for the head;

detecting the moving velocity of the head;

calculating a difference between the detected velocity and the target velocity and effecting digital calculation for obtaining a control value for velocity control of the head with a predetermined calculating interval on the basis of the calculated difference;

varying the calculating interval in said digital calculation step such that the calculating interval is proportionally shortened as the head approaches the target track; and controlling the moving velocity of the head on the basis of the control value.

22. A velocity controlling method in which a light beam spot is moved from a current track to a target track under velocity control, said method comprising the steps of:

generating a target moving velocity for the light beam spot;

detecting the moving velocity of the light beam spot;

calculating a difference between the detected velocity and the target velocity and effecting digital calculation for obtaining a control value for velocity control of the light beam spot with a predetermined calculating interval on the basis of the calculated difference;

varying the calculating interval in said digital calculation step such that the calculating interval is proportionally shortened as the had approaches the target track; and controlling the moving velocity of the light beam spot on the basis of the control value.

* * * * *

UNITED STATES PATENT AND TRADEMARK OFFICE
CERTIFICATE OF CORRECTION

PATENT NO. : 5,475,663
DATED : December 12, 1995
INVENTOR(S) : TSUKASA OGINO

It is certified that error appears in the above-indentified patent and that said Letters Patent is hereby corrected as shown below:

ON THE COVER PAGE: Column 2, line 2,

Under "U.S. PATENT DOCUMENTS":

"Yamauchi et al." should read --Yamaguchi et al.--.

COLUMN 1:

Line 23, "A control" should read --In such a control--.

COLUMN 3:

Line 24, "apparatus" should read --apparatus.--.

COLUMN 5:

Line 8, "25" should be deleted; and

Line 39, "or-having" should read --or having--.

COLUMN 7:

Line 15, "$\Delta S_{n-1}=S_n S_{n-1}$" should read --$\Delta S_n=S_n-S_{n-1}$--; and Line 37, "with" should be deleted.

UNITED STATES PATENT AND TRADEMARK OFFICE
CERTIFICATE OF CORRECTION

PATENT NO. : 5,475,663
DATED : December 12, 1995
INVENTOR(S) : TSUKASA OGINO

It is certified that error appears in the above-indentified patent and that said Letters Patent is hereby corrected as shown below:

COLUMN 10:

Line 18, "a" should read --at--.

COLUMN 16:

Line 4, "had" should read --head--.

Signed and Sealed this

Fourth Day of June, 1996

Attest:

BRUCE LEHMAN

Attesting Officer     Commissioner of Patents and Trademarks